(12) United States Patent
Spence

(10) Patent No.: US 11,143,414 B2
(45) Date of Patent: Oct. 12, 2021

(54) AIDED SAFETY COOKING APPLIANCE

(71) Applicant: Karen Spence, Chino Hills, CA (US)

(72) Inventor: Karen Spence, Chino Hills, CA (US)

( * ) Notice: Subject to any disclaimer, the term of this patent is extended or adjusted under 35 U.S.C. 154(b) by 347 days.

(21) Appl. No.: 16/178,661

(22) Filed: Nov. 2, 2018

(65) Prior Publication Data

US 2020/0141588 A1 May 7, 2020

(51) Int. Cl.
| | | |
|---|---|---|
| *H05B 1/02* | (2006.01) | |
| *G10L 15/00* | (2013.01) | |
| *F24C 7/08* | (2006.01) | |

(52) U.S. Cl.
CPC .............. *F24C 7/088* (2013.01); *F24C 7/081* (2013.01); *F24C 7/082* (2013.01); *G10L 15/00* (2013.01); *H05B 1/0263* (2013.01)

(58) Field of Classification Search
CPC .......... F24C 7/088; F24C 7/081; F24C 7/082; F24C 15/36; F24C 15/28; F24C 3/126; G10L 15/00; H05B 1/0263; B41J 11/009; B41J 15/044; B41J 2/325; B41J 3/4075; B41J 32/00; F16D 2051/005; F16D 51/00
USPC .............................. 219/398; D7/213, 402, 387
See application file for complete search history.

(56) References Cited

U.S. PATENT DOCUMENTS

| | | | |
|---|---|---|---|
| 4,351,999 A | | 9/1982 | Nagamoto |
| 4,506,142 A * | | 3/1985 | Takano .................. G10L 15/26 219/490 |
| 4,679,342 A * | | 7/1987 | Wilson ................. G09B 21/006 40/337 |
| D294,107 S | | 2/1988 | Katagami |
| 5,438,180 A | | 8/1995 | Eisenbrandt |
| 5,611,327 A * | | 3/1997 | Teixeira Filho ........ F24C 3/124 126/39 G |
| 6,255,630 B1* | | 7/2001 | Barnes .................... F24C 7/082 219/395 |
| 7,126,088 B2 | | 10/2006 | Horton |
| 8,692,162 B2* | | 4/2014 | Elston .................. H05B 1/0263 219/391 |
| 2002/0113062 A1 | | 8/2002 | Cranford |
| 2007/0277802 A1* | | 12/2007 | Reed ....................... F24C 15/36 126/42 |
| 2009/0090345 A1* | | 4/2009 | Reischmann .......... F24C 15/36 126/24 |
| 2010/0126805 A1* | | 5/2010 | Oh ........................ G07F 19/205 186/37 |

(Continued)

OTHER PUBLICATIONS

US 5,255,630 A1, 07/2001, Barnes (withdrawn)

*Primary Examiner* — Dana Ross
*Assistant Examiner* — Adam Michael Eckardt

(57) ABSTRACT

An aided safety cooking appliance includes a housing having a front side with an oven aperture extending through to proximal a rear side and a rear side extending above the top side to form an upper panel. An oven door is coupled to the housing to open and alternatively cover the oven aperture. A range top comprises a plurality of burners coupled within the top side of the housing. A plurality of heating elements is coupled within each of the plurality of burners and the oven aperture. A pair of control units comprises an upper control unit and a lower control unit. Each of the pair of control units comprises a plurality of buttons. A CPU is coupled to the housing and is in operational communication with the plurality of buttons of each of the pair of control units and with the plurality of heating elements.

7 Claims, 5 Drawing Sheets

(56) References Cited

U.S. PATENT DOCUMENTS

2013/0323663 A1* 12/2013 Harward ............... A47J 39/02
                                                    432/247
2017/0238751 A1* 8/2017 Vengroff ............... F24C 7/087

* cited by examiner

AIDED SAFETY COOKING APPLIANCE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to cooking appliances and more particularly pertains to a new cooking appliance for safe and assisted cooking.

BRIEF SUMMARY OF THE INVENTION

An embodiment of the disclosure meets the needs presented above by generally comprising a housing having a front side separated from a rear side, a left side separated from a right side, and a bottom side separated from a top side. The front side has an oven aperture extending through to proximal the rear side and a drawer aperture below the oven aperture extending through to proximal the rear side. The rear side extends above the top side and forms an upper panel. An oven door is coupled to the housing, the oven door having a hinge swingingly coupled to the front side below the oven aperture, the oven door opening and alternatively covering the oven aperture. A heating drawer is slidably coupled within the drawer aperture. A range top is coupled to the housing and comprises a plurality of burners coupled within the top side of the housing. A plurality of heating elements is coupled within each of the plurality of burners and the oven aperture. A pair of control units comprises an upper control unit coupled within the upper panel and a lower control unit coupled within the front side above the oven aperture. Each of the pair of control units comprises a plurality of buttons including a power switch. A CPU is coupled to the housing and is in operational communication with the plurality of buttons of each of the pair of control units and with the plurality of heating elements.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
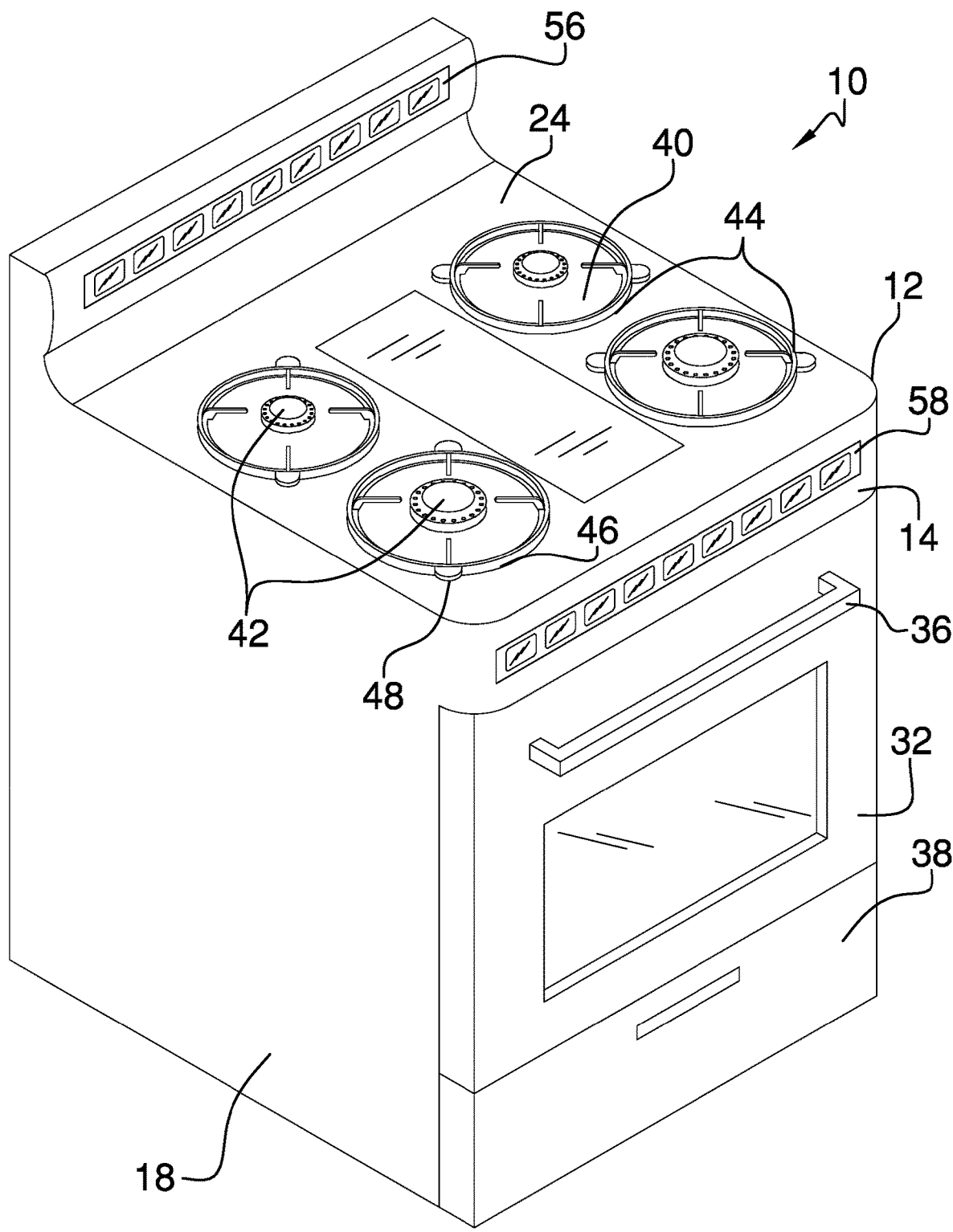
FIG. 1 is an isometric view of an aided safety cooking appliance according to an embodiment of the disclosure.
Figure 2:
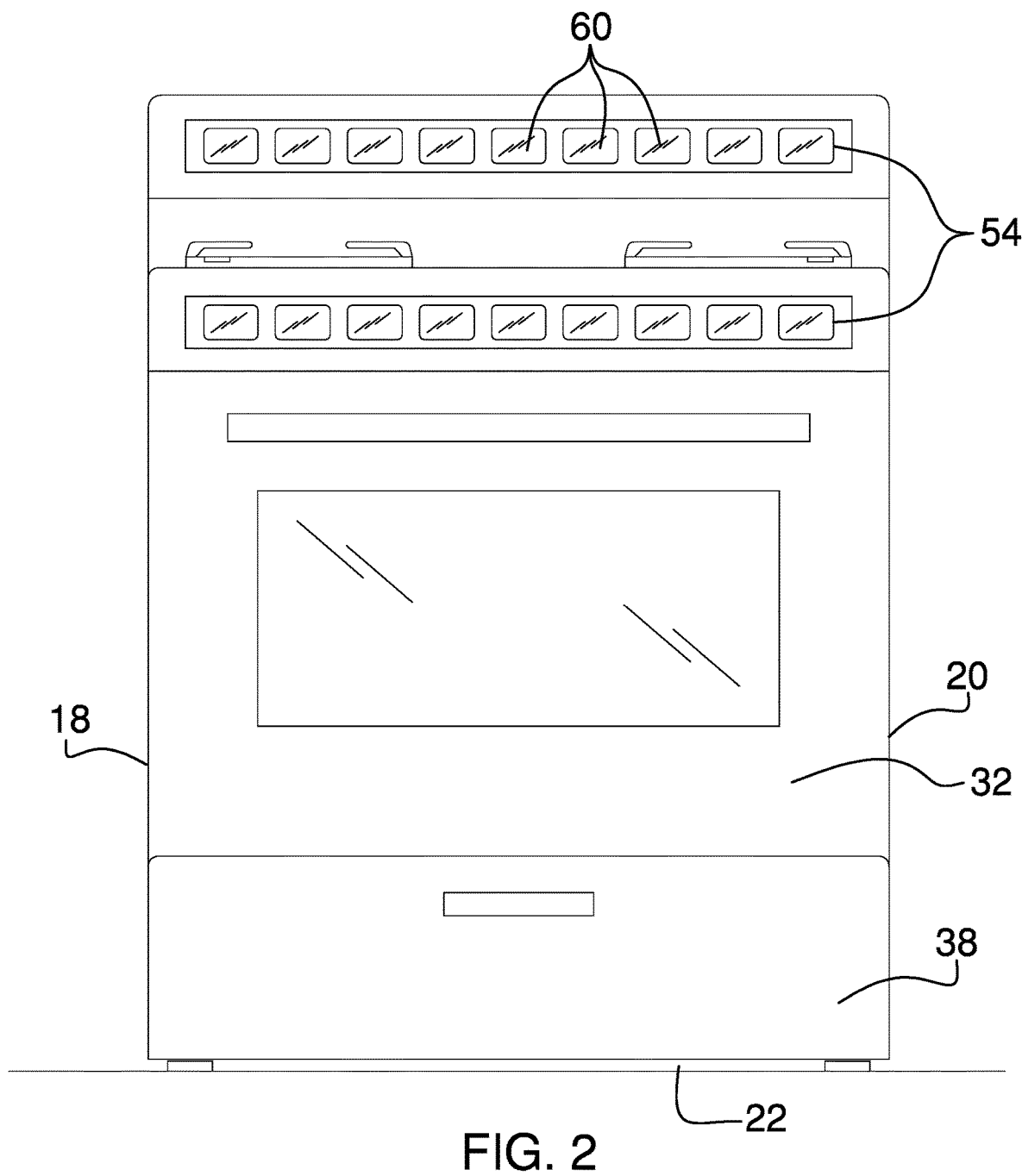
FIG. 2 is a front elevation view of an embodiment of the disclosure.
Figure 3:
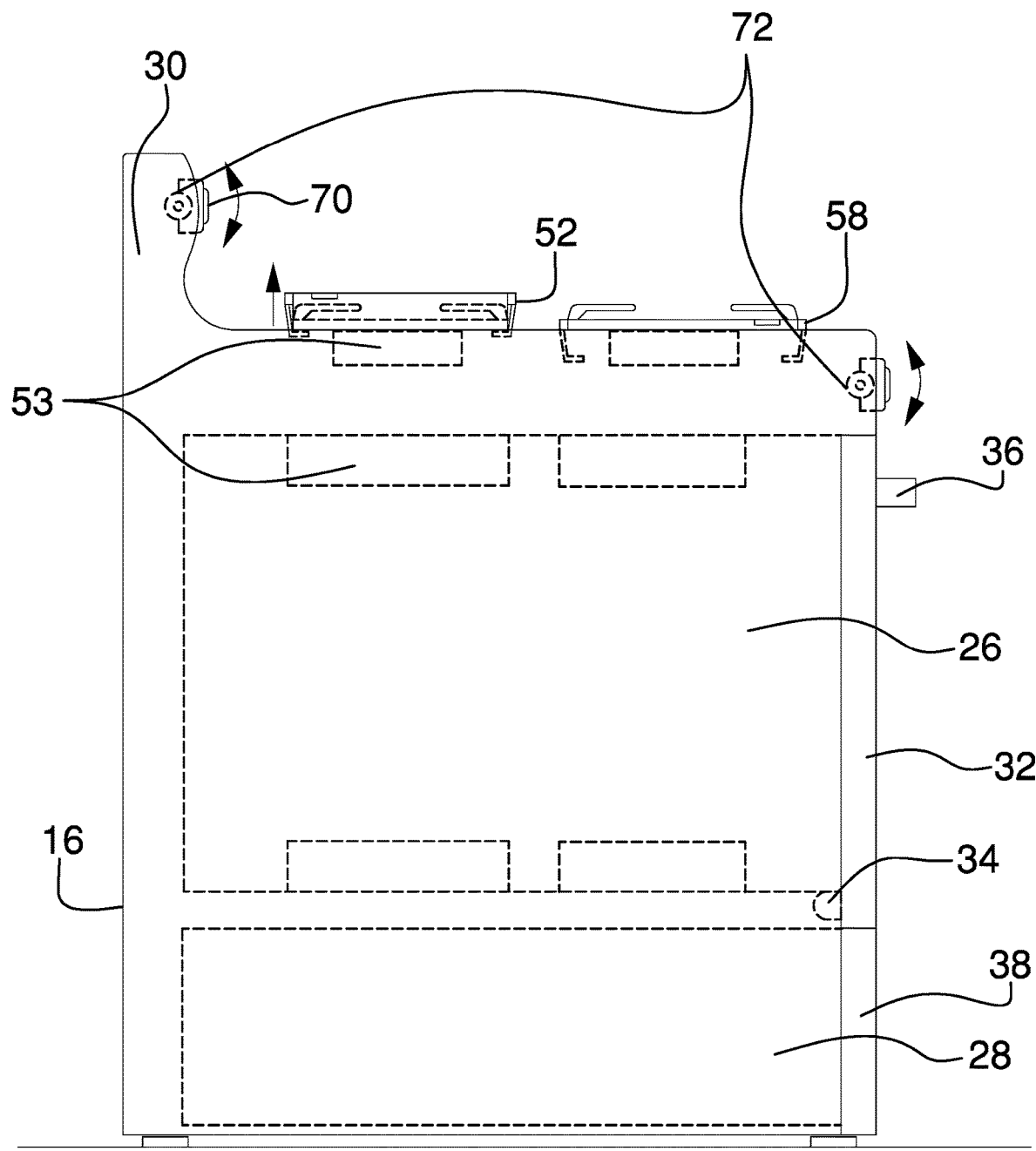
FIG. 3 is a side elevation view of an embodiment of the disclosure.
Figure 4:
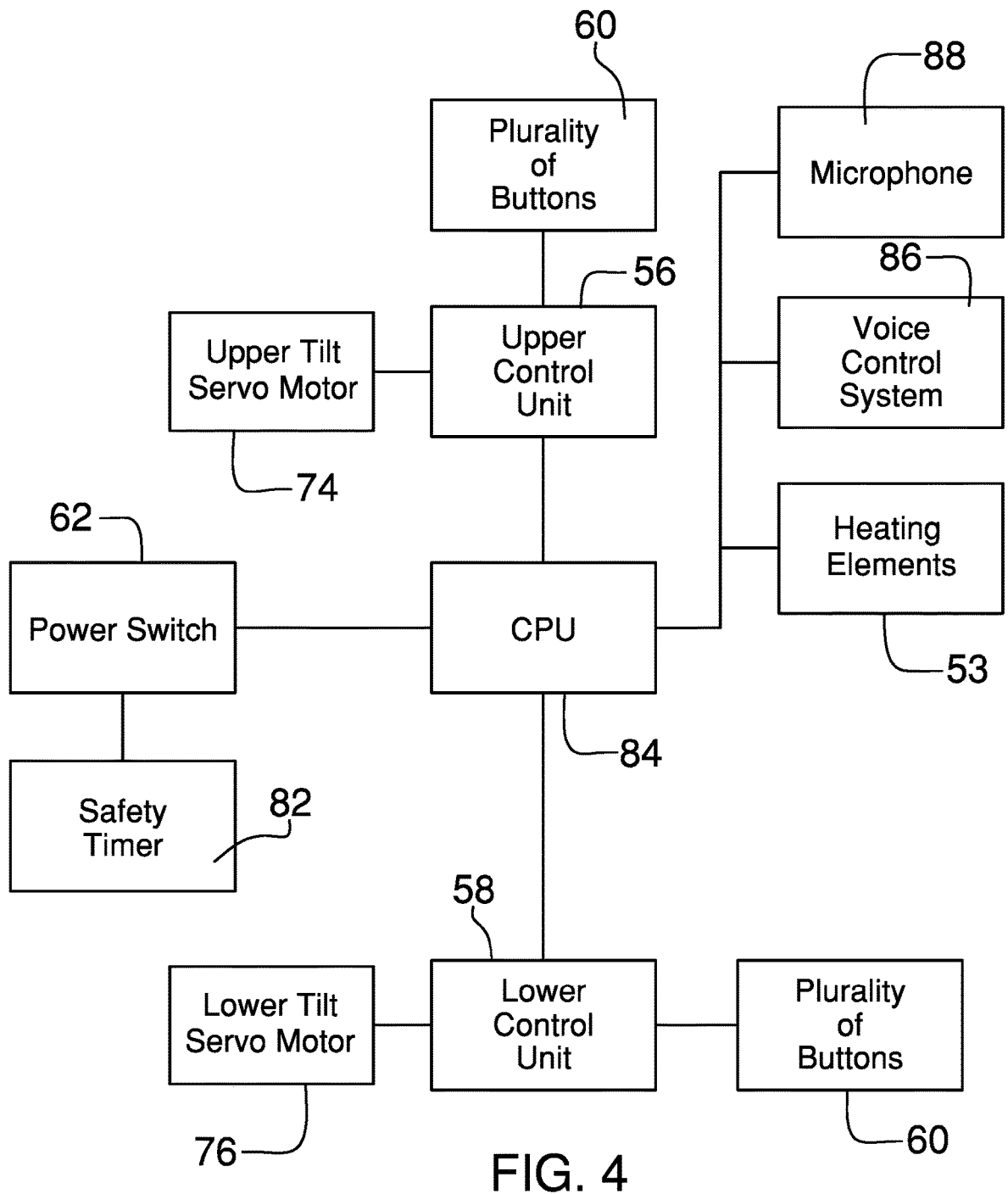
FIG. 4 is a block diagram view of an embodiment of the disclosure.
Figure 5:
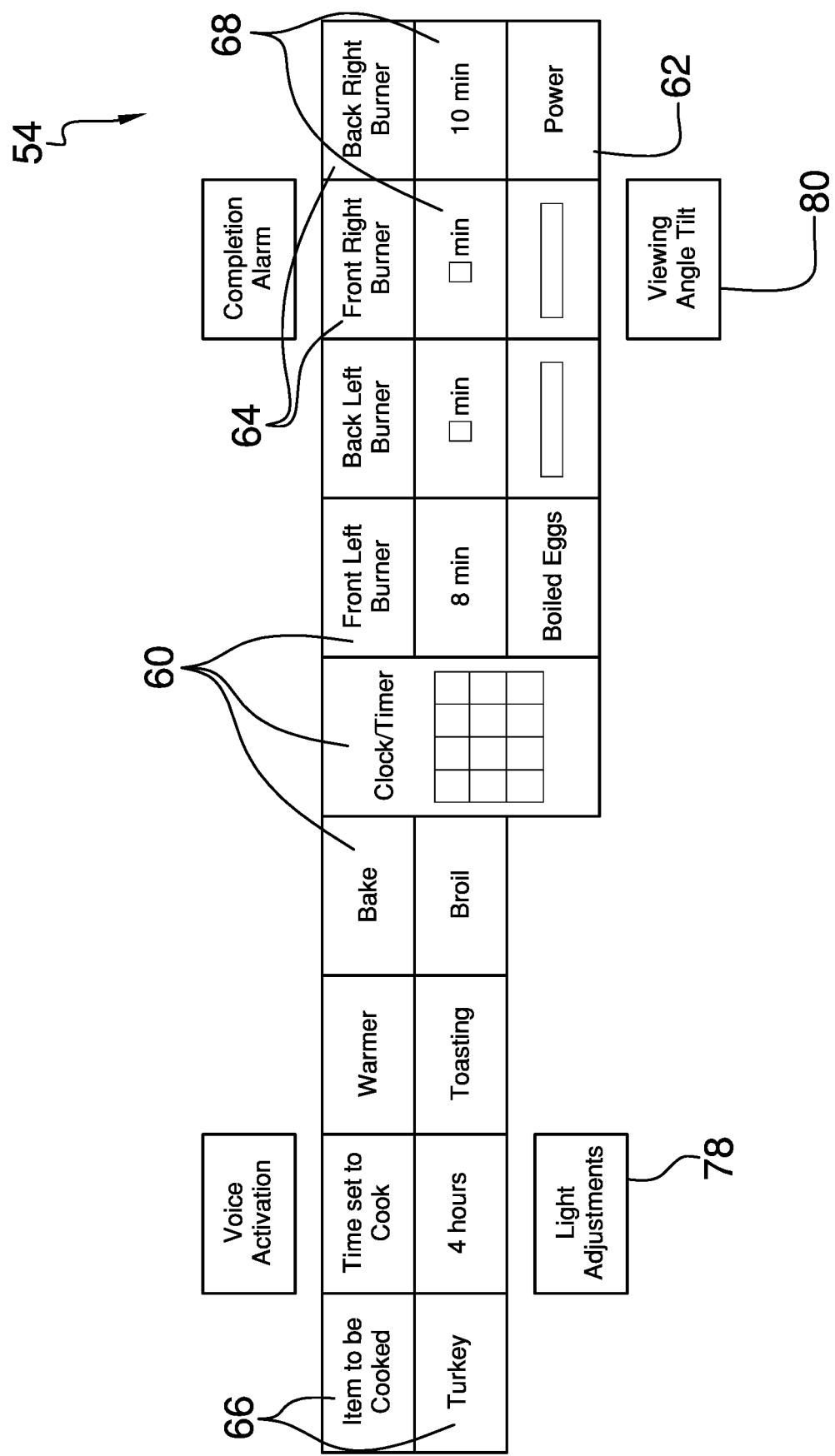
FIG. 5 is a detail view of an embodiment of the disclosure.

With reference now to the drawings, and in particular to FIGS. 1 through 5 thereof, a new cooking appliance embodying the principles and concepts of an embodiment of the disclosure and generally designated by the reference numeral 10 will be described.

As best illustrated in FIGS. 1 through 5, the aided safety cooking appliance 10 generally comprises a housing 12 having a front side 14 separated from a rear side 16, a left side 18 separated from a right side 20, and a bottom side 22 separated from a top side 24. The front side 14 has an oven aperture 26 extending through to proximal the rear side 16 and a drawer aperture 28 below the oven aperture 26 extending through to proximal the rear side 16. The rear side 16 extends above the top side 24 and forms an upper panel 30. An oven door 32 is coupled to the housing 12 and has a hinge 34 swingingly coupled to the front side 14 below the oven aperture 26 to allow the oven door 32 to open and alternatively cover the oven aperture 26. A door handle 36 may be coupled to the oven door 32. A heating drawer 38 is slidably coupled within the drawer aperture 28. A range top 40 comprises a plurality of burners 42 coupled within the top side 24 of the housing. A plurality of pop-up pot guards 44 may be coupled to the top side 24 of the housing, each having a circular wall 46 coupled around the plurality of burners 42 and a pair of handles 48 coupled to the circular wall 46. Each of the plurality of pop-up pot guards 44 has a stored position 50 flush with the top side 24 of the housing and an alternate popped position 52 extending above the top side 25 of the housing. The plurality of pop-up pot guards not only secures pots in place on the plurality of burners, but also may be a heat resistant material such as silicon to prevent a blind user from accidental burns. A plurality of heating elements 53 is coupled within each of the plurality of burners 42 and the oven aperture 26.

A pair of control units 54 comprises an upper control unit 56 coupled within the upper panel 30 and a lower control unit 58 coupled within the front side 14 above the oven aperture 26. Each of the pair of control units 54 comprises a plurality of buttons 60 including a power switch 62. The different positioning of the upper control unit 56 and the lower control unit 58 accommodates needs and preferences of different users. The plurality of buttons 60 may include a plurality of heating element buttons 64 for each of the plurality of heating elements 53, a plurality of food item buttons 66, and a plurality of timer input buttons 68. Each of the pair of control units 54 may have a braille façade 70 coupled to the plurality of buttons 60 and may be illuminated. The braille façade 70 allows fully blind users to operate the pair of control units 54. The illumination color is adjustable to aid colorblind users. A pair of tilt servo motors 72 may be coupled to the pair of control units 54. The pair of tilt servo motors 72 comprises an upper tilt servo motor 74 coupled to, and in operational communication with, the upper control unit 56 and a lower tilt servo motor 76 coupled to, and in operational communication with, the lower control unit 58. The upper tilt servo motor 74 rotates the upper control unit 56 and the lower tilt servo motor 76 rotates the lower control unit 58 to adjust the viewing angle to aid users with eyesight difficulties to adjust to light patterns. The plurality of buttons 60 may include an illumination adjustment button 78 and a viewing angle adjustment button 80.

A safety timer 82 may be coupled within the housing 12 and in operational communication with the power switch 62 to automatically turn off the plurality of heating elements 53 after a period of inactivity to prevent possible fires. A CPU 84 is coupled to the housing and is in operational communication with the plurality of buttons 60 of each of the pair of control units and with the plurality of heating elements 53. A voice control system 86 may be coupled within the housing 12. The voice control system 86 has a microphone 88 and is in operational communication with the CPU 84. The voice control system 86 allows users to operate the pair of control units 54 using voice commands.

In use, a user operates either of the pair of control units 54 using the plurality of buttons 60 or the voice control system 86 to cook with the plurality of heating elements 53 in the range top 40 and the oven aperture 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An aided safety cooking appliance comprising:
   a housing having a front side separated from a rear side, a left side separated from a right side, and a bottom side separated from a top side, the front side having an oven aperture extending through to proximal the rear side and a drawer aperture below the oven aperture extending through to proximal the rear side, the rear side extending above the top side and forming an upper panel;
   an oven door coupled to the housing, the oven door having a hinge swingingly coupled to the front side below the oven aperture, the oven door opening and alternatively covering the oven aperture;
   a heating drawer coupled to the housing, the heating drawer being slidably coupled within the drawer aperture;
   a range top coupled to the housing, the range top comprising a plurality of burners coupled within the top side of the housing;
   a plurality of heating elements the plurality of heating elements including a plurality of burner heating elements, each burner heating element being coupled within an associated one of the plurality of burners, the plurality of heating elements including an oven heating element, the oven heating element being coupled to the housing within the oven aperture;
   a pair of control units coupled to the housing, the pair of control units comprising an upper control unit coupled within the upper panel and a lower control unit coupled within the front side above the oven aperture, each of the pair of control units comprising a plurality of buttons including a power switch; and
   a CPU coupled to the housing, the CPU being in operational communication with the plurality of buttons of each of the pair of control units and with the plurality of heating elements;
   a plurality of pop-up pot guards coupled to the top side of the housing, each of the plurality of pop-up pot guards having a fully circular wall extending completely around a respective one of the plurality of burners, each pop-up pot guard having a pair of handles coupled to the circular wall in diametrically opposed positions, each of the handles extending radially outward from the circular wall, each of the plurality of pop-up pot guards having a stored position flush with the top side of the housing and an alternate popped position extending above the top side of the housing.

2. The aided safety cooking appliance of claim 1 further comprising a pair of tilt servo motors, the pair of tilt servo motors comprising an upper tilt servo motor coupled to, and in operational communication with, the upper control unit and a lower tilt servo motor coupled to, and in operational communication with, the lower control unit, the upper tilt servo motor rotating the upper control unit and the lower tilt servo motor rotating the lower control unit.

3. The aided safety cooking appliance of claim 2 further comprising each of the pair of control units being illuminated.

4. The aided safety cooking appliance of claim 2 further comprising each of the pair of control units having a braille façade, the braille façade being coupled to the plurality of buttons.

5. The aided safety cooking appliance of claim 1 further comprising a voice control system coupled within the housing, the voice control system having a microphone, the voice control system being in operational communication with the CPU.

6. The aided safety cooking appliance of claim 2 further comprising a safety timer coupled within the housing, the safety timer being in operational communication with the power switch to automatically turn off the plurality of heating elements after a period of inactivity.

7. An aided safety cooking appliance comprising:
- a housing having a front side separated from a rear side, a left side separated from a right side, and a bottom side separated from a top side, the front side having an oven aperture extending through to proximal the rear side and a drawer aperture below the oven aperture extending through to proximal the rear side, the rear side extending above the top side and forming an upper panel;
- an oven door coupled to the housing, the oven door having a hinge swingingly coupled to the front side below the oven aperture, the oven door opening and alternatively covering the oven aperture;
- a heating drawer coupled to the housing, the heating drawer being slidably coupled within the drawer aperture;
- a range top coupled to the housing, the range top comprising a plurality of burners coupled within the top side of the housing;
- a plurality of pop-up pot guards coupled to the top side of the housing, each of the plurality of pop-up pot guards having a fully circular wall extending completely around a respective one of the plurality of burners, each pop-up pot guard having a pair of handles coupled to the circular wall in diametrically opposed positions, each of the plurality of pop-up pot guards having a stored position flush with the top side of the housing and an alternate popped position extending above the top side of the housing;
- a plurality of heating elements the plurality of heating elements including a plurality of burner heating elements, each burner heating element being coupled within an associated one of the plurality of burners, the plurality of heating elements including an oven heating element, the oven heating element being coupled to the housing within the oven aperture;
- a pair of control units coupled to the housing, the pair of control units comprising an upper control unit coupled within the upper panel and a lower control unit coupled within the front side above the oven aperture, each of the pair of control units comprising a plurality of buttons including a power switch, each of the pair of control units having a braille façade coupled to the plurality of buttons, each of the pair of control units being illuminated;
- a pair of tilt servo motors, the pair of tilt servo motors comprising an upper tilt servo motor coupled to, and in operational communication with, the upper control unit and a lower tilt servo motor coupled to, and in operational communication with, the lower control unit, the upper tilt servo motor rotating the upper control unit and the lower tilt servo motor rotating the lower control unit;
- a safety timer coupled within the housing, the safety timer being in operational communication with the power switch to automatically turn off the plurality of heating elements after a period of inactivity;
- a CPU coupled to the housing, the CPU being in operational communication with the plurality of buttons of each of the pair of control units and with the plurality of heating elements; and
- a voice control system coupled within the housing, the voice control system having a microphone, the voice control system being in operational communication with the CPU.

* * * * *